United States Patent [19]
Berthelet et al.

[11] Patent Number: 6,006,818
[45] Date of Patent: Dec. 28, 1999

[54] EXPANDED OR EXPANSIBLE PLASTIC MATERIAL FOR THE FABRICATION OF SUNK FOUNDRY MODELS AND SUNK MODELS COMPRISED OF SUCH MATERIAL

[75] Inventors: Emmanuel Berthelet; Michael Berthelet; Asita Bhattacharya, all of Pont-Sainte Maxence Cedex, France

[73] Assignee: Huttenes-Albertus France (S.A.R.L.), Pont-Sainte-Maxence Cedex, France

[21] Appl. No.: 08/860,953

[22] PCT Filed: Nov. 15, 1996

[86] PCT No.: PCT/FR96/01809

§ 371 Date: Dec. 5, 1997

§ 102(e) Date: Dec. 5, 1997

[87] PCT Pub. No.: WO97/18084

PCT Pub. Date: May 22, 1997

[30] Foreign Application Priority Data

Nov. 16, 1995 [FR] France .................................. 95 13612

[51] Int. Cl.⁶ .................................. B22C 7/02; C08J 9/00
[52] U.S. Cl. .............................. 164/34; 164/45; 164/235; 521/79; 521/94
[58] Field of Search .................................. 164/45, 34, 35, 164/235, 246; 521/79, 94

[56] References Cited

U.S. PATENT DOCUMENTS

| | | |
|---|---|---|
| 3,884,708 | 5/1975 | Burkert . |
| 4,633,929 | 1/1987 | Santangelo et al. .................. 164/45 X |
| 5,041,465 | 8/1991 | Sonnenerg ................................ 521/58 |
| 5,403,866 | 4/1995 | Kato et al. ............................ 164/45 X |
| 5,787,958 | 8/1998 | Shivkumar et al. .................. 164/45 X |

FOREIGN PATENT DOCUMENTS 2 193 666  2/1988  United Kingdom .

OTHER PUBLICATIONS

Abstracts of Japanese Patent Publication 59–218239 Published Dec. 8, 1984.

*Primary Examiner*—J. Reed Batten, Jr.
*Attorney, Agent, or Firm*—Burns, Doane, Swecker & Mathis, L.L.P.

[57] ABSTRACT

The models comprise an expanded or expansible polymer or copolymer generally used for the fabrication of such models. The polymer or copolymer contains an oxidizing agent comprising a nitroaliphatic compound that accepts expansion without substantial alteration of its oxidizing properties, that does not substantially modify the characteristics of the polymer or copolymer before, during and after expansion, that does not harm the quality of the metal that is cast, and that has a decomposition temperature essentially identical to that of the polymer or copolymer.

13 Claims, No Drawings

EXPANDED OR EXPANSIBLE PLASTIC MATERIAL FOR THE FABRICATION OF SUNK FOUNDRY MODELS AND SUNK MODELS COMPRISED OF SUCH MATERIAL

This invention relates to the field of manufacturing casting pieces by lost pattern molding.

The first process involved in this technique is manufacture of a tray made of an expanded plastic, which will be shaped to yield a pattern that will be shaped like the metallic piece. After preparing the molds and the pouring basin, also made of expanded plastics and joined to the pattern with glue, the caster applies a refractory coat with uniform thickness on the pattern, and after the coat has dried, the pattern is placed in a casting box. The actual casting is done by filling the box with sand, connected to a system of self-hardening bonding agent commonly used in foundries, until the pouring basin touches the upper part of the mold. After the sand has settled, the caster can proceed to casting the metal directly upon the expanded plastic.

This process is generically known as "lost casting"; it is more specifically intended for manufacturing prototypes, for single pieces or pieces in small series, but of large size.

The second process, also involved in this technique, is fabricating a series of patterns by expanding an expansible plastic. A cluster of patterns is obtained by gluing patterns onto the molds and the pouring basin. The cluster is then submerged in a refractory coat, or such a coat is sprinkled on it, and it is dried at low temperature; it is then placed in metallic containers, and sand, without bonding agent is incorporated up to the upper level of the pouring basin by vibration. The caster then directly proceeds to casting the metal upon the expanded plastic.

In English, this process is known as "lost foam"; it is more specifically meant for manufacturing repetitive pieces of small or medium size.

In the following, therefore, the term "lost pattern" will refer to patterns made of plastic and used in these two processes for manufacturing casting pieces by molding.

These processes are well known to casters and are thus based on elimination by gasification of a pattern, comprised of expanded plastic, during casting the metal, the latter taking on the shape of the mold while the pattern is gasified and disappears. It is often found that the pieces manufactured according to these processes have defects such as lack of metal adjacent to areas of carbon accumulation, in addition to changes in the chemical composition of metals in ferrous alloys.

The expanded or expansible plastics used for manufacturing lost patterns are copolymers or polymers such as:

Polystyrene expanded to a density of 20 g/liter, which is the most economical, but has the highest available carbon content; other polystyrenes with a more or less high density can also be used.

Methyl polymethacrylate, which is generally used at a density of 24 g/liter, where the price is much higher than the price of polystyrene.

Although the previously described processes are used very widely by casters, there has as yet been no explanation for the difficulties encountered here. It is probable that these difficulties are due to gasification of the plastic, which is essentially made of carbon and hydrogen constituting the lost pattern [lost foam]; it is decomposed due to the high temperature of the molten metal. This decomposition is preceded by a liquid front of plastic that is propelled by metallostatic pressure; in a reducing atmosphere, cracking causes the formation of carbon deposits known as "glossy carbon" to casters.

For ferrous alloys with a low carbon content, such as ordinary steel, carbon steel or manganese steel, the unoxidizable, special or alloyed steels have high potential solubility in terms of carbon; the defect resulting from the aforementioned processes is represented by a recovery of carbon that modifies the alloy.

For ferrous alloys with a high carbon content, e.g., such as gray iron, white iron with spheroidal graphite and alloyed, carbon solubility is inadequate, resulting in carbon structures that form metal marks on the sides and ceiling of the mold; these changes change the intended shape of the piece and render it useless. Moreover, the phenomena the may modify the metal's structure can result from carbon that is solubilized in the liquid metal, in particular, in the case of spheroidal graphite iron where one can observe a degeneration of the shape of the graphite nodules.

For light and cuprous alloys where the metal cannot solubilize the carbon, accumulation of it causes a lack of substance that makes the pieces shapeless.

Research done in this field pertains essentially to the structure of the expanded polymers and their speed of depolymerization, and deals very little with the study of the liquid/gas and polymer/metal fronts created by the molten metal upon contact with the plastic constituting the pattern.

Now, work done by the present inventors relates specifically to that aspect, and designed to give casters a solution to the problem deriving from the defective pieces manufactured by casting via lost pattern. Thus, the object of this invention is to cause—at the liquid/gas and polymer/metal interfaces—oxidation of the carbon-hydrogen and carbon-carbon bonds to yield gases and no longer solids, because carbon monoxide (CO) and carbon dioxide ($CO_2$) are insoluble in the above-mentioned metals. This purpose was attained thanks to an expanded or expansible plastic for manufacturing of lost casting patterns consisting of a polymer or an expanded or expansible copolymer, and an oxidizing agent, generally used in manufacturing such patterns.

The invention also relates to lost casting patterns for manufacturing molds prepared using the above-mentioned plastic:

either by mold-shaping the piece to be cast from a tray of expanded plastic comprised of an expanded polymer or copolymer used in manufacturing such patterns, and combined with an oxidizing agent in the context of the so-called "lost pattern process";

or by expanding in a cast in the shape of the piece to be cast comprised of expansible plastic made of a polymer or an expansible copolymer used in manufacturing such patterns, and combined with an oxidizing agent in the context of the so-called "lost foam" process.

The invention thus relates to an expanded or expansible plastic for producing lost casting patterns comprised of an expanded or expansible polymer or copolymer commonly used for manufacturing such patterns, and combined with an oxidizing agent having the following characteristics:

it accepts expansion without substantial alteration of its oxidizing properties;

it does not substantially modify the characteristics of the polymer or the copolymer with which it is associated before, during and after expansion;

it does not damage the quality of the metal that is cast;

it has a decomposition temperature that is essentially identical to the temperature of the polymer or copolymer with which it is associated, allowing oxidation of the carbon and the hydrogen of the latter during casting of the molten metal.

The study conducted by the present inventors on modifications in the plastic during casting of the molten metal allowed modeling of the phenomena that lead to the gasification of the latter in the form of four different temperature zones each corresponding to the state of the plastic of the lost pattern:

a) a zone that is very far removed from the casting of the molten metal where the polymer constituting the plastic is not modified;

b) a zone that is less removed than the preceding one from the molten metal where the polymer constituting the plastic is transformed into oligomers;

c) a middle zone where the total depolymerization of the polymer takes place, while the oligomers are transformed into monomers;

d) a very hot zone near the front of the molten metal where cracking takes place, i.e., combustion of the monomers in terms of carbon and hydrogen, a portion of which is eliminated through the coating into the sand, while another part is gasified due to the casting heat. It is in this stage that glossy carbon is formed preferably; this glossy carbon is deposited on the metal piece or accumulate on the walls or in the corners of the pattern.

The role of the oxidizing agent associated with the polymer in the plastic of the invention is to promote gasification of carbon and hydrogen, which has not been evacuated into the sand, to the last stage (d) of cracking. Therefore, it is necessary for the oxidizing agent to have a decomposition temperature that it essentially identical to the temperature of the polymer or copolymer with which it is associated, to allow oxidation of the carbon and of the hydrogen in stage (d). Indeed, if the oxidizing agent has too low a melting point, it will be decomposed prior to the cracking phase and will thus not be able to perform its function.

One of the advantageous aspects of the invention is that it permits association of an oxidizing agent and the polymer or copolymer with all of the stages preceding the final expansion by means of vapor and thus offers the caster a plastic either already expanded and possibly shaped and hence directly usable as pattern or an expansible plastic, for example, possibly a pre-expanded matter that the caster himself subjects to the final expansion operation in preparation for the desired pattern.

It is an advantage if the content of oxidizing agent in said plastic is between about 5 and 50% by weight, i.e., between 10 and 100% of the base polymer or copolymer (prior to incorporation of the oxidizing agent.)

According to the first embodiment of the plastic of the invention, the polymer or the copolymer and the oxidizing agent form a copolymer.

According to the second embodiment of the plastic of the invention, the polymer or the copolymer is mixed with the oxidizing agent prior to expansion. The mixture can be made by submerging the pre-expanded polymer or copolymer granules into a liquid bath that, for example, is a suspension or a solution containing the oxidizing agent. after mixing, the granules are dried and are then subjected to expansion.

This mixture can lead to the coating or impregnation of the polymer or copolymer by the oxidizing agent; any other combination technique known to an expert in the field can be used as long as it does not modify the properties of the oxidizing agent and the polymer. This may involve, for example, electrostatic deposits.

As the oxidizing agent that is incorporated in the expanded or expansible plastic of the invention, one might consider all of the oxygenated compounds, more particularly, the nitrated ones that have the necessary properties. In particular, the peroxides or the nitroaliphatic compounds or a mixture of the latter might be considered.

Among the nitroaliphatic compounds that are useful as oxidizing agent in a plastic involved in the invention, preference is given to the nitro alcohols and, more specifically, to those having the following general formula:

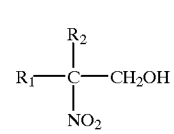

(I)

where $R_1$ and $R_2$ denote the following: a hydrogen atom, a group having the following formula $-(CH_2)OH$, a lower alkyl group, an alicyclic or aromatic group, or a group having the following formula:

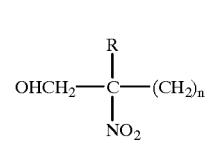

(II)

where R has the same meaning as $R_1$ or $R_2$ and where n is a whole number between 1 and 6.

Oxidizing agents having this general formula are the following, for example:

2-nitro-2-methyl-1-propanol having the following formula:

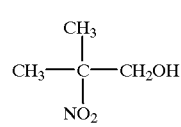

(III)

whose melting point is 94° C.

2-nitro-2-ethyl-1,3-propane-diol having the formula:

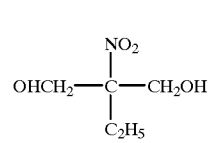

(IV)

whose melting point is about 56° C.

tris(hydroxymethyl)nitromethane having the formula:

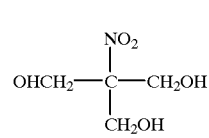

(V)

whose melting point is about 175° C.

2-nitro-2-methyl-1,3-propane-diol having the formula:

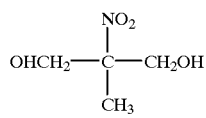
(VI)

whose melting point is about 160° C.

These compounds are well known and are commercially available, as are nitro alcohols that have more than one nitro group, such as certain dinitro-alcohols obtained from alpha-omega-dinitroalkanes (Feuer, F. et al., TETRAHEDRON 1963, Vol. 19, pp. 54–57) such as:

2,5-bishydroxymethyl-2,5-dinitro-1,6-hexanediol having the formula:

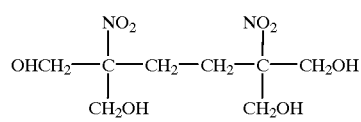
(VII)

whose melting point is about 122° C. or
the compound having the following formula:

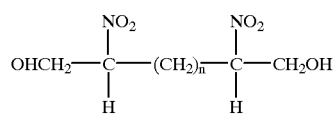
(VIII)

whose melting point is about 163° C. where n=2 and 110° C. where n=3.

The nitro alcohol compounds that are preferred as oxidizing agents involved in the makeup of the expanded or expansible plastics according to the invention are those with melting points greater than or equal to 90° C. and that are miscible in a solvent and preferably in water.

The expanded or expansible polymer with which the oxidizing agent is associated in the plastic involved in the invention is polystyrene (PS) or polymethylmethacrylate (PMMA), or any other polymer or copolymer known to casters for manufacturing lost patterns.

The chemical degradation of PMMA begins at 160° C. and its speed of volatilization increases with the temperature. Depolymerization is complete at about 400° C. and the decomposition products are exclusively monomers. With the increase in temperature, the monomer yield diminishes and the gases formed undergo pyrolysis starting at 800C. At 1200° C., the pyrolysis products are essentially as follows: $CH_4$, $C_2H_5$, $C_2H_4$, $C_3H_6$, and a large quantity of CO and $CO_2$. No residue is left over at this temperature, compared with PS, which still yields about 5% residue.

Studies conducted on the pyrolysis of PS show that the styrene monomer yield reaches its maximum around 500 to 700° C. (Anal. Chem. 33, 1961, pp. 873–898). This maximum coincides with the maximum volatilization speed. At 1300° C., the speed of formation of liquid products is on the order of 0.27 g/sec cm² for PMMA and 0.68 g/sec cm² for expanded PS (AFS Transactions, 95–153, pp. 519–524, S. Shivkumar). Now, the liquid products are responsible for the defects in the pieces. With the increase in temperature, these liquid products promote formation of carbon deposits on the metal. The presence of two oxygen atoms per unit of monomer in the PMMA molecule promotes the formation of CO and $CO_2$ and reduces the carbon content available for producing glossy carbon.

The nitro alcohols are thermally unstable at the PS decomposition temperature. Because of their high oxygen content, these nitro alcohols behave like oxidants with respect to PS at the moment the metal is cast. The oxidation of PS by nitro alcohols leads to formation of $CO/CO_2$ gases and diminishes the formation of liquids with an oligomer base, while decreasing the rate of metal recarburation. Formation of glossy carbon deposits are thus limited. Use of an oxidizing agent associated with the polymer in a plastic according to the invention also makes it possible to replace PMMA with PS, a less expensive polymer.

The invention also relates to a casting pattern prepared with a previously-defined expanded plastic as well as to the process of preparing such a pattern consisting of the following:

either making a tray consisting of expanded plastic as defined earlier, which shall be shaped to give a pattern with the form of the piece to be cast;

or proceeding to the vapor expansion, in a cast with the shape of the piece to be cast, using a previously-defined expansible plastic.

The invention finally relates to a process for producing casting pieces by lost pattern casting using an above-defined lost pattern.

Other features and advantages of the invention will emerge from reading the following examples concerning the preparation and use of the plastics involved in the invention, with the understanding that these examples should not in any way be interpreted as reducing the scope of the claims.

Granules of PS were dipped into baths of 2-nitro-2-methyl-1,3-propane-diol having Formula (VI) to obtain granules (after drying) that are coated with this oxidizing agent, constituted of pre-expanded (expansible) plastic comprising 5%, 10%, 15% and 30% 2-nitro-2-methyl-1,3-propane-diol.

After injection and expansion, these expanded plastic substances (PS with a density of 20 g/liter) were shaped to prepare a lost casting pattern for the production of steel pieces weighing about 20 kg. The pattern weighs about 68 g and contains about 75 to 90% carbon or about 51 to 61 g of carbon.

After preparing the patterns that were treated with a refractory coating of zirconium and after preparing the castings and pouring basins, the pieces were cast in accordance with conventional techniques known to casters.

The pieces thus obtained were compared to similar control pieces made according to an identical process but from a lost pattern prepared with expanded plastic either comprised of PS with a density of 20 g/liter or consisting of PMMA with a density of 50 g/liter. The comparison in Table I below focuses on the following:

(1) recovery of carbon on the pieces, i.e., the additional amount of carbon with respect to the quantity in the metal bath, and (2) the carbon content of the pattern recovered from the metal of the piece.

Furthermore, Table 1 shows the chemical analysis of the metallic bath that one finds in the piece (casting carbon).

TABLE I

|  | Control PS | Control PMMA | PS + 5% | PS + 10% | PS + 15% | PS + 30% |
|---|---|---|---|---|---|---|
| Casting carbon | 0.23 | 0.23 | 0.27 | 0.27 | 0.27 | 0.27 |
| 1) Carbon recovery on pieces | 0.137 | 0.140 | 0.114 0.128 | 0.112 0.08 | 0.056 0.082 | 0.012 0.013 |
| 2) Carbon content of pattern | 57.7% | 37.7% | 44.8% 49.6% | 44% 32.3% | 22.11% 32.3% | 4.8% 5.2% |

Two identical pieces were made for each level of oxidizing agent contained in the plastic. On each piece, we observed a drop in the carbon content recovered on the piece due to the gasification of the pattern. This drop is increasingly significant as the oxidizing agent content grows in the plastic.

These results show the importance of associating an oxidizing agent with the polymer comprising the plastic of the pattern for reducing glossy carbon formation. Furthermore, the use of such oxidizing agent makes it possible to use a polymer whose quality is not as good but whose price is lower such as PS instead of, for example, PMMA, and making up for the added cost incurred by using an oxidizing agent.

We claim:

1. An expanded or expandible plastic for producing lost casting patterns, said plastic comprising an expanded or expansible polymer or copolymer and an oxidizing agent, wherein the oxidizing agent is a nitroaliphatic compound or a mixture thereof.

2. The plastic according to claim 1, which comprises between about 5 and 50% by weight of the oxidizing agent.

3. The plastic according to claim 1, wherein the polymer or copolymer and the oxidizing agent form a copolymer.

4. The plastic according to claim 1, wherein the polymer or copolymer and the oxidizing agent are mixed prior to expansion.

5. The plastic according to claim 4, wherein the polymer or copolymer are coated with the oxidizing agent.

6. The plastic according to claim 1, wherein the nitroaliphatic compound is a nitro alcohol having the formula (I):

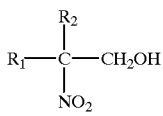

(I)

where $R_1$ and $R_2$ are each selected from the group consisting of a hydrogen atom, —$(CH_2)OH$, a lower alkyl, an alicyclic or aromatic group, and a group having the formula (II):

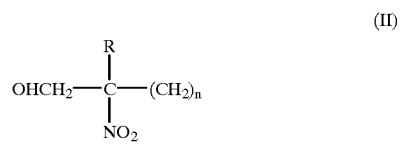

(II)

where R has the same meaning as $R_1$ and $R_2$, and n is a whole number between 1 and 6.

7. The plastic according to claim 6, wherein the nitroaliphatic compound is selected from the group consisting of 2-nitro-2-methyl-1-propanol, 2-nitro-2-ethyl-1,3-propane-diol, tris(hydroxymethyl)nitromethane, 2-nitro-2-methyl-1,3-propane-diol, and 2,5-bishydroxymethyl-2,5-dinitro-1,6-hexanediol having the formula (VIII):

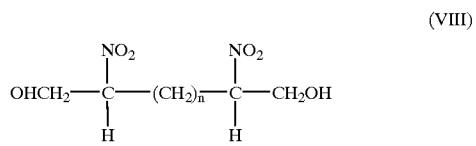

(VIII)

where n is a whole number between 0 and 6.

8. The plastic according to claim 1, wherein the oxidizing agent has a melting point of greater than or equal to 90° C. and is miscible in a solvent.

9. The plastic according to claim 8, wherein the solvent is water.

10. A lost casting pattern which is made from the plastic according to claim 1.

11. A process for the preparation of a lost casting pattern, which comprises forming a tray comprising the plastic according to claim 1, and shaping the tray in the form of a piece to be cast.

12. A process for the preparation of a lost casting pattern, which comprises proceeding to vapor expansion in a cast comprising the plastic according to claim 1.

13. A process for the manufacture of casting pieces by lost pattern casting, which comprises casting pieces using the lost casting pattern according to claim 10.

* * * * *